United States Patent [19]

Wakamiya

[11] Patent Number: 4,457,596
[45] Date of Patent: Jul. 3, 1984

[54] BEHIND DIAPHRAGM LENS
[75] Inventor: Koichi Wakamiya, Tokyo, Japan
[73] Assignee: Nippon Kogaku K.K., Tokyo, Japan
[21] Appl. No.: 424,262
[22] Filed: Sep. 27, 1982
[51] Int. Cl.³ .............................................. G02B 9/34
[52] U.S. Cl. .................................................. 350/472
[58] Field of Search ............................... 350/472, 456

[56] References Cited

U.S. PATENT DOCUMENTS 3,848,972 11/1974 Nakamura ........................... 350/456
4,063,802 12/1977 Imai et al. ........................... 350/456
4,232,945 11/1980 Hyakumura ........................ 350/472

FOREIGN PATENT DOCUMENTS 1018236 10/1957 Fed. Rep. of Germany ...... 350/472

Primary Examiner—John K. Corbin
Assistant Examiner—Scott J. Sugarman
Attorney, Agent, or Firm—Fitzpatrick, Cella, Harper & Scinto

[57] ABSTRACT

In a four-unit five-lens system wherein in succession from the object side, each of a first lens and a second lens comprises a positive meniscus lens having its convex surface facing the object side, a third lens comprises a biconcave lens, a fourth lens comprises a biconvex lens, a fifth lens comprises a negative meniscus lens having its convex surface facing the image side, the fourth lens and the fifth lens being cemented together to form a positive cemented lens, and a diaphragm is provided most adjacent to the image side, a behind diaphragm lens satisfies certain conditions.

4 Claims, 5 Drawing Figures

BEHIND DIAPHRAGM LENS

BACKGROUND OF THE INVENTION

1. Field of the Invention

This invention relates to a compact four-unit five-lens behind diaphragm lens having an angle of view of 60° or greater and brightness of the order of F2.8.

2. Description of the Prior Art

Generally, as a behind diaphragm lens having brightness of the order of F2.8, use is made of a Tessar type lens or a modified type thereof. In the Tessar type, if the focal length of the lens system is f, aberrations are well corrected when the length from the fore end to the image plane or surface (the total length of the lens) is of the order of 1.15f.

In contrast, in a type wherein the direction of the cemented surface of a cemented lens of the Tessar type having its convex surface facing the object side is reversed and the first lens of the cemented lens is a positive lens and the second lens of the cemented lens is a negative lens and a positive meniscus lens of a first unit is divided into two positive lenses, the total length of the lens can be shortened to the order of 1.08f and therefore, such type is used as a compact lens. A four-unit five-lens behind diaphragm lens of this type is known from Japanese Laid-open Patent Application No. 30027/1979 or No. 39510/1981, but generally, as regards the off-axis light beam, coma and chromatic coma of a light ray passing through the vicinity of a center of the diaphragm, namely, a light ray entering from the underside, tend to remain saliently, and this has led to an insufficient depiction.

SUMMARY OF THE INVENTION

It is an object of the present invention to provide a behind diaphragm lens of the four-unit five-lens modified Tessar type in which the total length of the lens is maintained compact and yet various aberrations, particularly, coma and chromatic coma, are well corrected.

The invention will become fully apparent from the following detailed description thereof taken in conjunction with the accompanying drawings.

DETAILED DESCRIPTION OF THE PREFERRED EMBODIMENTS

Figure 1:
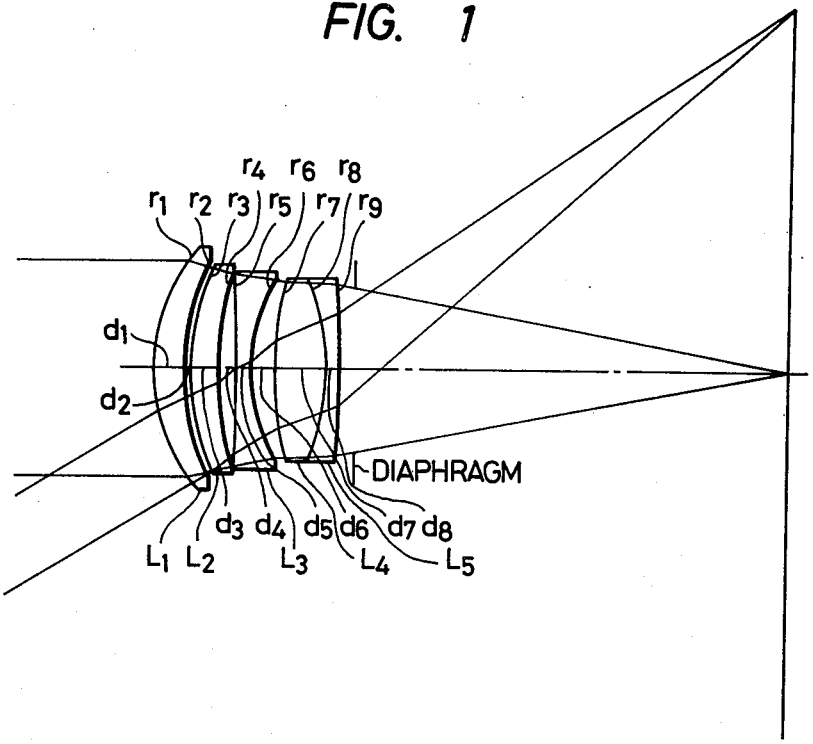
FIG. 1 shows the optical path of a behind diaphragm lens according to the present invention.
Figure 2:
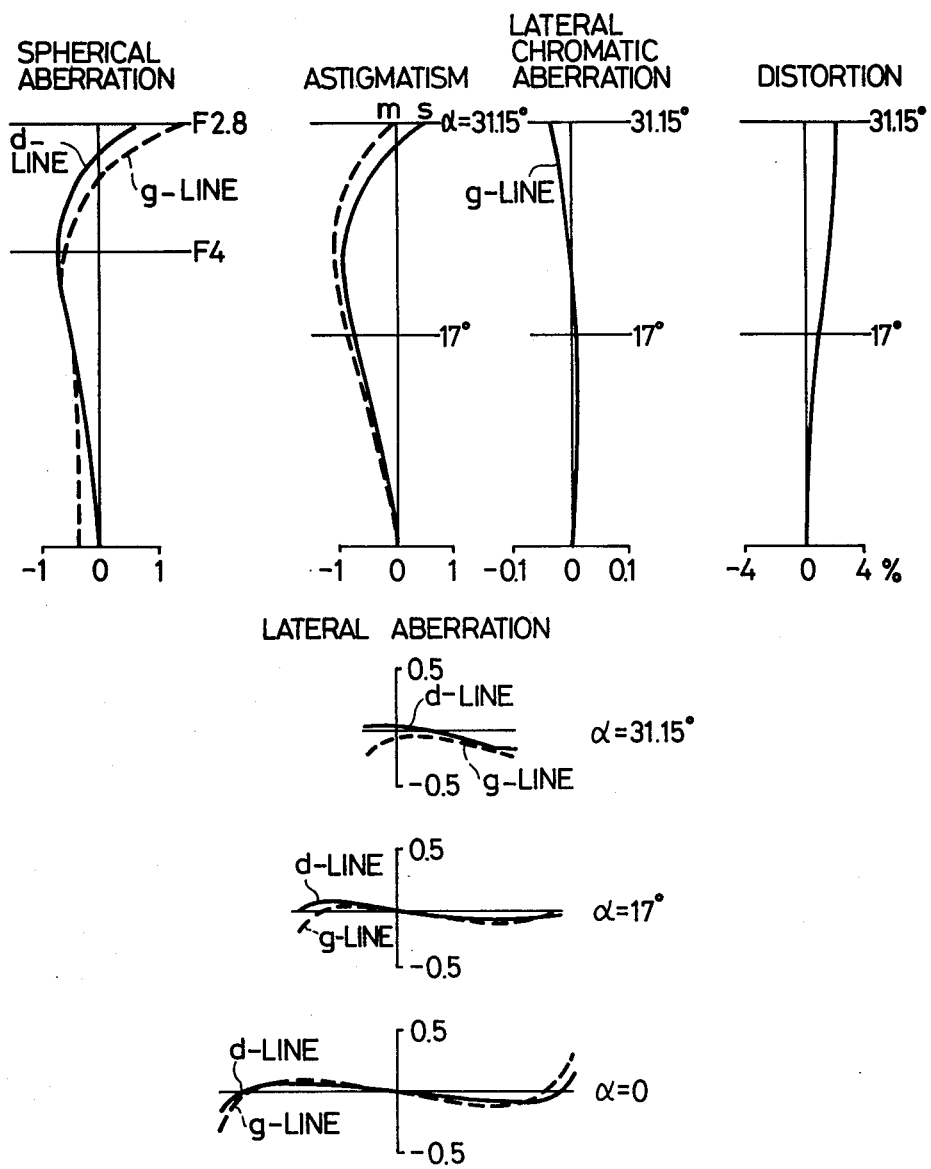
FIG. 2 shows the various aberrations in embodiment 1.
Figure 3:
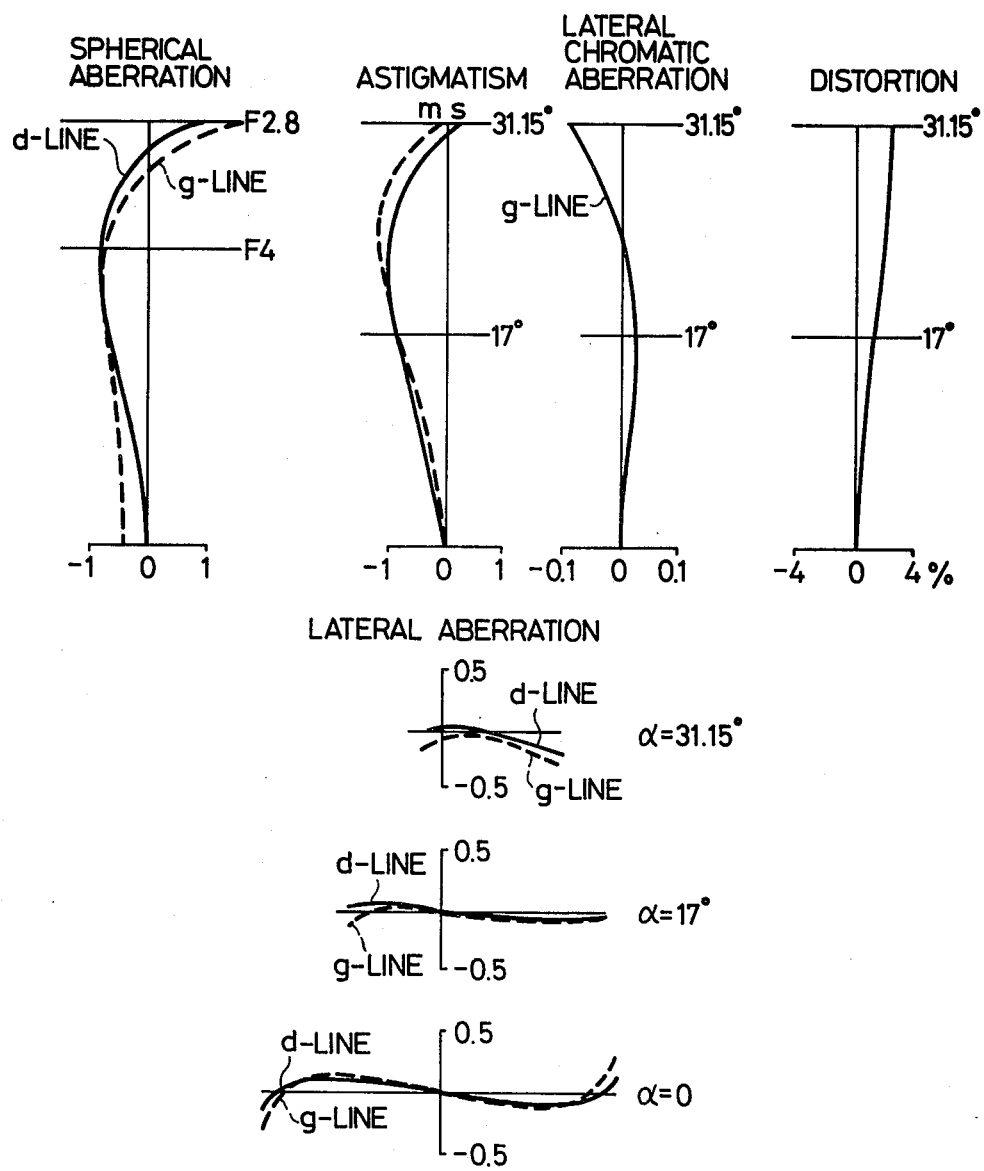
FIG. 3 shows the various aberrations in embodiment 2.
Figure 4:
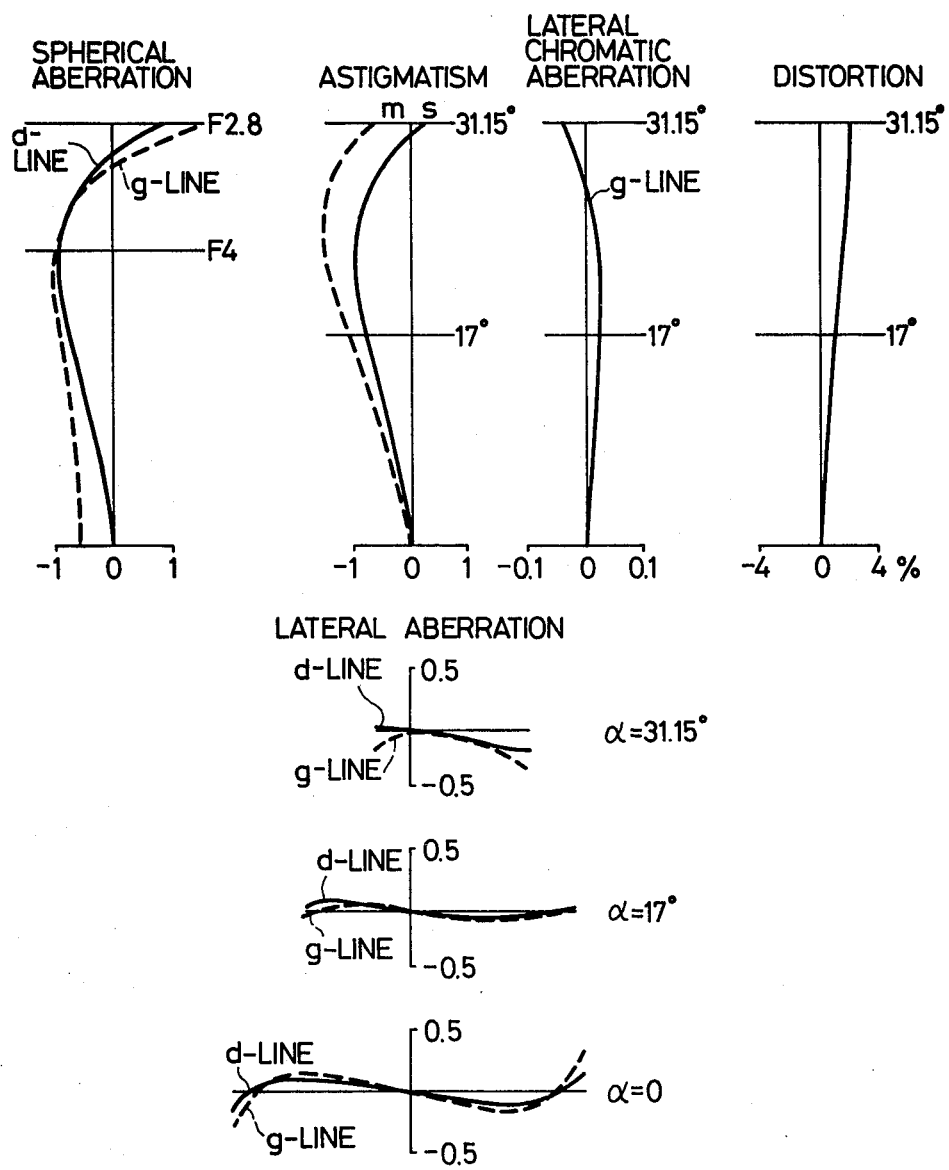
FIG. 4 shows the various aberrations in embodiment 3.
Figure 5:
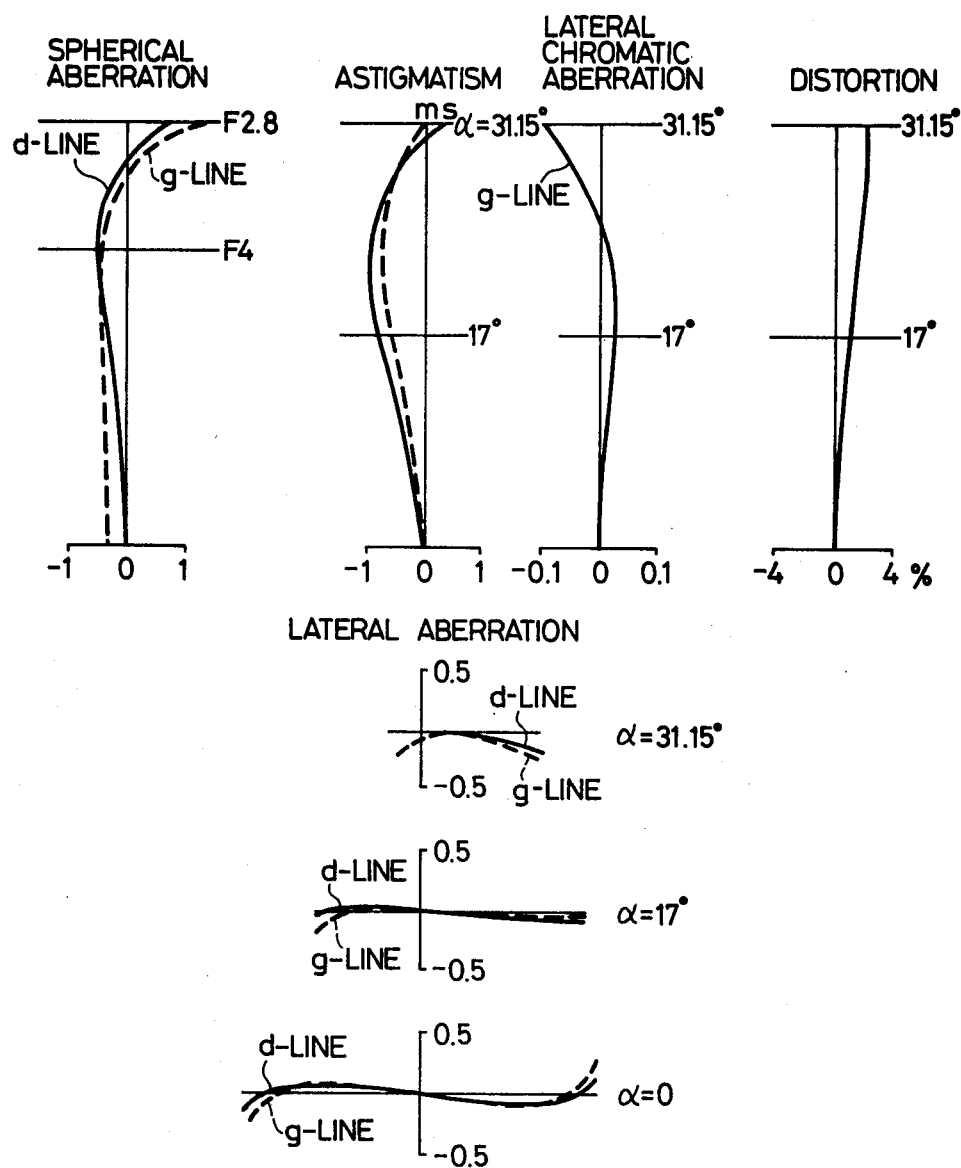
FIG. 5 shows the various aberrations in embodiment 4.

The lens system according to the present invention is obtained by satisfying, in a four-unit five-lens lens system wherein, as shown in the optical path representation of FIG. 1, in succession from the object side, each of a first lens $L_1$ and a second lens $L_2$ comprises a positive meniscus lens having its convex surface facing the object side, a third lens $L_3$ comprises a biconcave lens, and a fourth lens $L_4$ and a fifth lens $L_5$ are cemented together to form a cemented positive lens, the fourth lens $L_4$ comprising a biconvex lens and the fifth lens $L_5$ comprising a negative meniscus lens having its convex surface facing the image side, and a diaphragm is provided most adjacent to the image side, the following conditions:

(1) $0.7 < f_{1,2}/f_{4,5} < 1.4$
(2) $26.0 < \nu_3 < 36.0$
(3) $49.8 < \nu_1 < 59.0$
(4) $\nu_4 < \nu_5$
(5) $0.05 < r_1/f_1 < 0.40$
(6) $0.20 < r_3/f_2 < 0.55$
(7) $3.0 < r_5/f_3 < 11.0$
(8) $0.65 < r_7/f < 0.95$
(9) $1.04 < n_4/n_5 < 1.12$ where f: the composite focal length of the lens
$f_i$: the focal length of the ith lens from the object side
$f_{i,j}$: the composite focal length of the ith to jth lenses from the object side
$r_i$: the radius of curvature of the ith surface from the object side
$d_i$: the ith spacing between lens surfaces from the object side
$n_i$: the refractive index of the ith lens from the object side
$\nu_i$: the Abbe number of the ith lens from the object side.

The above conditions of the present invention will hereinafter be described in detail. In the optical path representation of FIG. 1, the marginal light ray and oblique light ray of a maximum angle of view from the on-axis infinity object point are depicted to make the following description readily understood.

Condition (1) prescribes the ratio of the composite focal length of the first $L_1$ and the second lens $L_2$ positioned near the object side to the focal length of the cemented positive lens comprising the fourth $L_4$ and the fifth lens $L_5$ positioned near the image side. If the upper limit of condition (1) is exceeded, the principal point of the lens will come near the image side and therefore the total length of the lens will become great and thus, the object of the present invention will not be achieved. If the lower limit of condition (1) is exceeded, the principal point of the lens will come near the object side and this is advantageous to shorten the total length of the lens, but the refractive powers of the first and second lenses lying at positions more remote from the diaphragm will become relatively strong as compared with the refractive power of the cemented lens lying near the diaphragm and thus, there will occur positive distortion which cannot be corrected.

Conditions (2), (3) and (4) are for well correcting chromatic aberration. The on-axis chromatic aberration is corrected by making the third lens $L_3$ which is a negative lens into high dispersion and making the positive lens into low dispersion. If the upper limit of condition (2) is exceeded and the third lens $L_3$ is made into a lower dispersion, there will arise the necessity of relatively shifting the dispersion of the positive lens toward the lower dispersion side, but in this case, the refractive index of the positive lens will necessarily be reduced and therefore, the Petzval sum of the optical system will become under-corrected and thus, cannot be corrected. The light ray under side of the oblique light ray is subjected to a strong diverging action by the third lens $L_3$, but if the dispersion of the third lens is made higher, it will be more advantageous for the correction of the Petzval sum, while light rays of shorter wavelength than the light ray of standard wavelength will be strongly diverged to increase chromatic coma. Accordingly, if the lower limit of condition (2) is exceeded and the third lens is made into a higher dispersion, chromatic coma will not be corrected.

Condition (3) is for keeping lateral chromatic aberration good under condition (2). If the upper limit of condition (3) is exceeded and the dispersion of the first lens $L_1$ is made low, the lateral chromatic aberration of light rays of short wavelength relative to the light ray of standard wavelength will become negative and will not be corrected. If the lower limit of condition (3) is exceeded, the lateral chromatic aberration of light rays of short wavelength will become positive and will not be corrected.

Condition (4), together with condition (2), is for correcting the chromatic coma of the light rays under side of the oblique light ray. By making the dispersion of the fourth lens $L_4$ great as compared with the dispersion of the negative fifth lens $L_5$, light rays of shorter wavelength than the standard wavelength can be refracted strongly in the converging direction with respect to the light rays under side of the oblique ray and chromatic coma which is liable to occur in the negative third lens $L_3$ can be corrected better.

Condition (5) is for well correcting spherical aberration. If such a bending that makes the radius of curvature of the first surface of the first lens $L_1$ small is applied, the light ray converging action will become stronger on the first surface and therefore, spherical aberration will be under-corrected. If the bending of the first lens becomes excessive, there will arise the necessity of increasing the negative power of the third lens $L_3$ and thereby compensating for the deficient correction, but due to the fact that the radius of curvature of each surface becomes small, high order spherical aberration will occur and may result in flare. If the lower limit of condition (5) is exceeded, the bending will become excessive and therefore, for the reason set forth above, high order spherical aberration will become so great that it cannot be corrected. As the amount of bending of the first lens becomes smaller, correction of spherical aberration becomes easier, but the power of the negative third lens decreases, so that the Petzval sum becomes positive and, if the upper limit of condition (5) is exceeded, spherical aberration and the value of the Petzval sum cannot be well corrected.

Condition (6) is for keeping the image plane good. If the upper limit of condition (6) is exceeded, the oblique light ray will be subjected to a strong converging action on the surface of the second lens $L_2$ which is adjacent to the image side and therefore, the meridional image plane will become negative and cannot be corrected. If the lower limit of condition (6) is exceeded, the meridional image plane will become positive and cannot be corrected.

Condition (7) is for correcting coma. The off-axis light is subjected to a converging action by the first lens $L_1$ and the second lens $L_2$, whereafter it enters the third lens $L_3$ having a diverging action. If the third lens is bent in a direction in which the curvature of the surface thereof which is adjacent to the object side becomes sharper and the degree of bending is too strong, particularly the lower limit ray of the off-axis light rays will be subjected to a strong diverging action by the object side surface of the third lens, which will relatively exceed the converging action of the first and second lenses and thus, coma flare will occur. Accordingly, if the lower limit of condition (7) is exceeded, said coma flare cannot be corrected. If the upper limit of condition (7) is exceeded, the diverging action on the first surface of the third lens will become weak relative to the converging action of the first and second lenses because aforementioned bending of the third lens is weak, and therefore coma cannot be corrected.

Condition (8) is for correcting chiefly the upper coma flare of the oblique light ray. If the upper limit of condition (8) is exceeded, the converging action on the surface of the fourth lens which is adjacent to the object side will become weak and therefore, coma flare will occur and will not be corrected. If the lower limit of condition (8) is exceeded, the converging action on the surface of the fourth lens which is adjacent to the object side will become strong and therefore, coma flare will occur and will not be corrected.

If the lower limit of condition (9) is exceeded, the Petzval sum of the cemented lens will become great and therefore, the Petzval sum of the entire lens will be caused to go in the positive direction, namely, the under-correction direction, and thus good aberration correction will not be effected. If the upper limit of condition (9) is exceeded, it will be advantageous for the correction of the Petzval sum, but the light rays under the oblique light ray will be strongly converged by the fourth lens and therefore, for the correction of this there will arise the necessity of intensifying the divergence of the third lens and, since the third lens is of high dispersion, chromatic coma will become great and will not be well corrected.

The numerical data of the four embodiments of the present invention will be shown below. In the tables below, $r_1, r_2, r_3, \ldots$ represent the radii of curvature of the successive lens surfaces from the object side, $d_1, d_2, d_3, \ldots$ represent the center thicknesses of the successive lenses and air spaces, $n_1, n_2, \ldots$ represent the refractive indices of the successive lenses for d-line ($\lambda = 587.6$ nm), and $\nu_1, \nu_2, \ldots$ represent the Abbe numbers of the successive lenses.

Embodiment 1

| | | | |
|---|---|---|---|
| f = 100 | F 2.8 | $2\omega = 62.3°$ | |
| $r_1 = +31.974$ | $d_1 = 5.7250$ | $n_1 = 1.713$ | $\nu_1 = 54.0$ |
| $r_2 = +46.733$ | $d_2 = 0.5725$ | | |
| $r_3 = +38.655$ | $d_3 = 5.1525$ | $n_2 = 1.77279$ | $\nu_2 = 49.4$ |
| $r_4 = +72.381$ | $d_4 = 2.4331$ | | |
| $r_5 = -264.361$ | $d_5 = 2.5762$ | $n_3 = 1.68893$ | $\nu_3 = 31.1$ |
| $r_6 = +28.170$ | $d_6 = 4.2937$ | | |
| $r_7 = +83.665$ | $d_7 = 8.5875$ | $n_4 = 1.77279$ | $\nu_4 = 49.4$ |
| $r_8 = -31.587$ | $d_8 = 2.2900$ | $n_5 = 1.62041$ | $\nu_5 = 60.4$ |
| $r_9 = -192.429$ | | | |
| Back focal length | | 76.3 | |
| Total length of the lens | | 107.9 | |
| $f_1 = 122.3$ | | | |
| $f_2 = 100.6$ | | | |
| $f_3 = -36.8$ | | | |
| $f_{1,2} = 56.9$ | | | |
| $f_{4,5} = 59.3$ | | | |
| Petzval sum 0.00205 | | | |

Embodiment 2

| | | | |
|---|---|---|---|
| f = 100 | F 2.8 | $2\omega = 62.3°$ | |
| $r_1 = +34.522$ | $d_1 = 3.7213$ | $n_1 = 1.74810$ | $\nu_1 = 52.1$ |
| $r_2 = +36.377$ | $d_2 = 0.5725$ | | |
| $r_3 = +30.787$ | $d_3 = 6.8701$ | $n_2 = 1.79668$ | $\nu_2 = 45.5$ |
| $r_4 = +80.154$ | $d_4 = 2.9341$ | | |
| $r_5 = -279.097$ | $d_5 = 2.5763$ | $n_3 = 1.72825$ | $\nu_3 = 28.3$ |

-continued

| | | | |
|---|---|---|---|
| $r_6 = +28.090$ | $d_6 = 4.1793$ | | |
| $r_7 = +80.199$ | $d_7 = 8.5876$ | $n_4 = 1.74400$ | $\nu_4 = 45.1$ |
| $r_8 = -29.782$ | $d_8 = 2.2900$ | $n_5 = 1.61025$ | $\nu_5 = 56.7$ |
| $r_9 = -151.136$ | | | |

Back focal length 76.2
Total length of the lens 108.0
$f_1 = 486.9$
$f_2 = 59.1$
$f_3 = -34.9$
$f_{1,2} = 54.8$
$f_{4,5} = 57.7$
Petzval sum 0.00242

Embodiment 3

$f = 100 \quad F\,2.8 \quad 2\omega = 62.3°$

| | | | |
|---|---|---|---|
| $r_1 = +30.485$ | $d_1 = 6.5713$ | $n_1 = 1.74810$ | $\nu_1 = 52.1$ |
| $r_2 = +51.999$ | $d_2 = 0.2857$ | | |
| $r_3 = +51.524$ | $d_3 = 4.5713$ | $n_2 = 1.80411$ | $\nu_2 = 46.4$ |
| $r_4 = +68.035$ | $d_4 = 2.7142$ | | |
| $r_5 = -152.379$ | $d_5 = 2.5714$ | $n_3 = 1.69895$ | $\nu_3 = 30.1$ |
| $r_6 = +29.482$ | $d_6 = 2.9485$ | | |
| $r_7 = +71.407$ | $d_7 = 8.5712$ | $n_4 = 1.80218$ | $\nu_4 = 44.7$ |
| $r_8 = -28.768$ | $d_8 = 2.0000$ | $n_5 = 1.67790$ | $\nu_5 = 55.6$ |
| $r_9 = -129.088$ | | | |

Back focal length 77.9
Total length of the lens 108.1
$f_1 = 87.1$
$f_2 = 235.0$
$f_3 = -35.1$
$f_{1,2} = 63.8$
$f_{4,5} = 49.5$
Petzval sum 0.00205

Embodiment 4

$f = 100 \quad F\,2.8 \quad 2\omega = 62.3°$

| | | | |
|---|---|---|---|
| $r_1 = +33.342$ | $d_1 = 5.7141$ | $n_1 = 1.73350$ | $\nu_1 = 51.1$ |
| $r_2 = +54.496$ | $d_2 = 0.2857$ | | |
| $r_3 = +39.985$ | $d_3 = 5.1427$ | $n_2 = 1.74810$ | $\nu_2 = 52.1$ |
| $r_4 = +70.504$ | $d_4 = 2.9485$ | | |
| $r_5 = -364.848$ | $d_5 = 2.5714$ | $n_3 = 1.68893$ | $\nu_3 = 31.1$ |
| $r_6 = +28.116$ | $d_6 = 4.9799$ | | |
| $r_7 = +84.144$ | $d_7 = 8.5712$ | $n_4 = 1.72000$ | $\nu_4 = 50.3$ |
| $r_8 = -34.065$ | $d_8 = 2.2857$ | $n_5 = 1.56384$ | $\nu_5 = 60.8$ |
| $r_9 = -182.001$ | | | |

Back focal length 74.9
Total length of the lens 107.4
$f_1 = 105.1$
$f_2 = 115.2$
$f_3 = -37.8$
$f_{1,2} = 56.0$
$f_{4,5} = 63.1$
Petzval sum 0.00259

The various aberrations in the above-described embodiments are shown in FIGS. 2 to 5. In these figures, the spherical aberration for d-line ($\lambda = 587.6$ nm) and g-line ($\lambda = 435.8$ nm), the astigmatism for d-line, the lateral chromatic aberration for g-line, the distortion for d-line, and the lateral aberration for d-line and g-line are shown.

As shown in these figures, in any of the described embodiments, the total length of the lens is as small as the order of 1.08 f and yet, the various aberrations are all well corrected and particularly, the lateral aberration representing coma is good and the balance with d-line and g-line also is good and the occurrence of chromatic coma is very small and thus, all of the embodiments have an excellent imaging performance.

As described above, according to the present invention, there is provided a behind diaphragm lens which has an angle of view of 60° or greater and brightness of the order of F2.8 and in which the total length of the lens is maintained compact and yet various aberrations, particularly, coma and chromatic coma, are well corrected.

I claim:

1. In a four-unit five-lens lens system wherein in succession from the object side, each of a first lens and a second lens comprise a positive meniscus lens having its convex surface facing the object side, a third lens comprises a biconcave lens, a fourth lens comprises a biconvex lens, a fifth lens comprises a negative meniscus lens having its convex surface facing the image side, the fourth lens and the fifth lens being cemented together to form a positive cemented lens, and a diaphragm is provided most adjacent to the image side, a behind diaphragm lens satisfying the following conditions:

(1) $0.7 < f_{1,2}/f_{4,5} < 1.4$
(2) $26.0 < \nu_3 < 36.0$
(3) $49.8 < \nu_1 < 59.0$
(4) $\nu_4 < \nu_5$
(5) $0.05 < r_1/f_1 < 0.40$
(6) $0.20 < r_3/f_2 < 0.55$
(7) $3.0 < r_5/f_3 < 11.0$
(8) $0.65 < r_7/f < 0.95$
(9) $1.04 < n_4/n_5 < 1.12$ where
  f: the composite focal length of the lens
  $f_i$: the focal length of the ith lens from the object side
  $f_{i,j}$: the composite focal length of the ith to jth lenses from the object side
  $r_i$: the radius of curvature of the ith surface from the object side
  $d_i$: the ith spacing between lens surfaces from the object side
  $n_i$: the refractive index of the ith lens from the object side
  $\nu_i$: the Abbe number of the ith lens from the object side; and wherein numerical data are as follows:

$f = 100 \quad F\,2.8 \quad 2\omega = 62.3°$

| | | | |
|---|---|---|---|
| $r_1 = +31.974$ | $d_1 = 5.7250$ | $n_1 = 1.713$ | $\nu_1 = 54.0$ |
| $r_2 = +46.733$ | $d_2 = 0.5725$ | | |
| $r_3 = +38.655$ | $d_3 = 5.1525$ | $n_2 = 1.77279$ | $\nu_2 = 49.4$ |
| $r_4 = +72.381$ | $d_4 = 2.4331$ | | |
| $r_5 = -264.361$ | $d_5 = 2.5762$ | $n_3 = 1.68893$ | $\nu_3 = 31.1$ |
| $r_6 = +28.170$ | $d_6 = 4.2937$ | | |
| $r_7 = +83.665$ | $d_7 = 8.5875$ | $n_4 = 1.77279$ | $\nu_4 = 49.4$ |
| $r_8 = -31.587$ | $d_8 = 2.2900$ | $n_5 = 1.62041$ | $\nu_5 = 60.4$ |
| $r_9 = -192.429$ | | | |

Back focal length 76.3
Total length of the lens 107.9
$f_1 = 122.3$
$f_2 = 100.6$
$f_3 = -36.8$
$f_{1,2} = 56.9$
$f_{4,5} = 59.3$
Petzval sum 0.00205 where $n_1, n_2, \ldots$ represent the refractive indices of the successive lenses for d-line ($\lambda = 587.6$ nm).

2. In a four-unit five-lens lens system wherein, in succession from the object side, each of a first lens and a second lens comprise a positive meniscus lens having its convex surface facing the object side, a third lens comprises a biconcave lens, a fourth lens comprises a biconvex lens, a fifth lens comprises a negative meniscus lens having its convex surface facing the image side, the fourth lens and the fifth lens being cemented together to form a positive cemented lens, and a diaphragm is provided most adjacent to the image side, a behind diaphragm lens satisfying the following conditions:

(1) $0.7 < f_{1,2}/f_{4,5} < 1.4$
(2) $26.0 < \nu_3 < 36.0$
(3) $49.8 < \nu_1 < 59.0$
(4) $\nu_4 < \nu_5$
(5) $0.05 < r_1/f_1 < 0.40$
(6) $0.20 < r_3/f_2 < 0.55$
(7) $3.0 < r_5/f_3 < 11.0$
(8) $0.65 < r_7/f < 0.95$
(9) $1.04 < n_4/n_5 < 1.12$ where
- f: the composite focal length of the lens
- $f_i$: the focal length of the ith lens from the object side
- $f_{i,j}$: the composite focal length of the ith to jth lenses from the object side
- $r_i$: the radius of curvature of the ith surface from the object side
- $d_i$: the ith spacing between lens surfaces from the object side
- $n_i$: the refractive index of the ith lens from the object side
- $\nu_i$: the Abbe number of the ith lens from the object side; and wherein numerical data are as follows:

| | f = 100 | F 2.8 | $2\omega = 62.3°$ | |
|---|---|---|---|---|
| $r_1 = +34.522$ | $d_1 = 3.7213$ | $n_1 = 1.74810$ | | $\nu_1 = 52.1$ |
| $r_2 = +36.377$ | $d_2 = 0.5725$ | | | |
| $r_3 = +30.787$ | $d_3 = 6.8701$ | $n_2 = 1.79668$ | | $\nu_2 = 45.5$ |
| $r_4 = +80.154$ | $d_4 = 2.9341$ | | | |
| $r_5 = -279.097$ | $d_5 = 2.5763$ | $n_3 = 1.72825$ | | $\nu_3 = 28.3$ |
| $r_6 = +28.090$ | $d_6 = 4.1793$ | | | |
| $r_7 = +80.199$ | $d_7 = 8.5876$ | $n_4 = 1.74400$ | | $\nu_4 = 45.1$ |
| $r_8 = -29.782$ | $d_8 = 2.2900$ | $n_5 = 1.61025$ | | $\nu_5 = 56.7$ |
| $r_9 = -151.136$ | | | | |

Back focal length 76.2
Total length of the lens 108.0
$f_1 = 486.9$
$f_2 = 59.1$
$f_3 = -34.9$
$f_{1,2} = 54.8$
$f_{4,5} = 57.7$
Petzval sum 0.00242 where $n_1, n_2, \ldots$ represent the refractive indices of the successive lenses for d-line ($\lambda = 587.6$ nm).

3. In a four-unit five-lens lens system wherein, in succession from the object side, each of a first lens and a second lens comprise a positive meniscus lens having its convex surface facing the object side, a third lens comprises a biconcave lens, a fourth lens comprises a biconvex lens, a fifth lens comprises a negative meniscus lens having its convex surface facing the image side, the fourth lens and the fifth lens being cemented together to form a positive cemented lens, and a diaphragm is provided most adjacent to the image side, a behind diaphragm lens satisfying the following conditions:

(1) $0.7 < f_{1,2}/f_{4,5} < 1.4$
(2) $26.0 < \nu_3 < 36.0$
(3) $49.8 < \nu_1 < 59.0$
(4) $\nu_4 < \nu_5$
(5) $0.05 < r_1/f_1 < 0.40$
(6) $0.20 < r_3/f_2 < 0.55$
(7) $3.0 < r_5/f_3 < 11.0$
(8) $0.65 < r_7/f < 0.95$
(9) $1.04 < n_4/n_5 < 1.12$ where
- f: the composite focal length of the lens
- $f_i$: the focal length of the ith lens from the object side
- $f_{i,j}$: the composite focal length of the ith to jth lenses from the object side
- $r_i$: the radius of curvature of the ith surface from the object side
- $d_i$: the ith spacing between lens surfaces from the object side
- $n_i$: the refractive index of the ith lens from the object side
- $\nu_i$: the Abbe number of the ith lens from the object side; and wherein numerical data are as follows:

| | f = 100 | F 2.8 | $2\omega = 62.3°$ | |
|---|---|---|---|---|
| $r_1 = +30.485$ | $d_1 = 6.5713$ | $n_1 = 1.74810$ | | $\nu_1 = 52.1$ |
| $r_2 = +51.999$ | $d_2 = 0.2857$ | | | |
| $r_3 = +51.524$ | $d_3 = 4.5713$ | $n_2 = 1.80411$ | | $\nu_2 = 46.4$ |
| $r_4 = +68.035$ | $d_4 = 2.7142$ | | | |
| $r_5 = -152.379$ | $d_5 = 2.5714$ | $n_3 = 1.69895$ | | $\nu_3 = 30.1$ |
| $r_6 = +29.482$ | $d_6 = 2.9485$ | | | |
| $r_7 = +71.407$ | $d_7 = 8.5712$ | $n_4 = 1.80218$ | | $\nu_4 = 44.7$ |
| $r_8 = -28.768$ | $d_8 = 2.0000$ | $n_5 = 1.67790$ | | $\nu_5 = 55.6$ |
| $r_9 = -129.088$ | | | | |

Back focal length 77.9
Total length of the lens 108.1
$f_1 = 87.1$
$f_2 = 235.0$
$f_3 = -35.1$
$f_{1,2} = 63.8$
$f_{4,5} = 49.5$
Petzval sum 0.00205 where $n_1, n_2, \ldots$ represent the refractive indices of the successive lenses for d-line ($\lambda = 587.6$ nm).

4. In a four-unit five-lens lens system wherein in succession from the object side, each of a first lens and a second lens comprise a positive meniscus lens having its convex surface facing the object side, a third lens comprises a biconcave lens, a fourth lens comprises a biconvex lens, a fifth lens comprises a negative meniscus lens having its convex surface facing the image side, the fourth lens and the fifth lens being cemented together to form a positive cemented lens, and a diaphragm is provided most adjacent to the image side, a behind diaphragm lens satisfying the following conditions:

(1) $0.7 < f_{1,2}/f_{4,5} < 1.4$
(2) $26.0 < \nu_3 < 36.0$
(3) $49.8 < \nu_1 < 59.0$
(4) $\nu_4 < \nu_5$
(5) $0.05 < r_1/f_1 < 0.40$
(6) $0.20 < r_3/f_2 < 0.55$
(7) $3.0 < r_5/f_3 < 11.0$
(8) $0.65 < r_7/f < 0.95$
(9) $1.04 < n_4/n_5 < 1.12$ where
- f: the composite focal length of the lens
- $f_i$: the focal length of the ith lens from the object side
- $f_{i,j}$: the composite focal length of the ith to jth lenses from the object side
- $r_i$: the radius of curvature of the ith surface from the object side
- $d_i$: the ith spacing between lens surfaces from the object side
- $n_i$: the refractive index of the ith lens from the object side
- $\nu_i$: the Abbe number of the ith lens from the object side; and wherein numerical data are as follows:

| | f = 100 | F 2.8 | $2\omega = 62.3°$ | |
|---|---|---|---|---|
| $r_1 = +33.342$ | $d_1 = 5.7141$ | $n_1 = 1.73350$ | | $\nu_1 = 51.1$ |
| $r_2 = +54.496$ | $d_2 = 0.2857$ | | | |
| $r_3 = +39.985$ | $d_3 = 5.1427$ | $n_2 = 1.74810$ | | $\nu_2 = 52.1$ |

-continued

| | | | |
|---|---|---|---|
| r₄ = +70.504 | d₄ = 2.9485 | | |
| r₅ = −364.848 | d₅ = 2.5714 | n₃ = 1.68893 | ν₃ = 31.1 |
| r₆ = +28.116 | d₆ = 4.9799 | | |
| r₇ = +84.144 | d₇ = 8.5712 | n₄ = 1.72000 | ν₄ = 50.3 |
| r₈ = −34.065 | d₈ = 2.2857 | n₅ = 1.56384 | ν₅ = 60.8 |
| r₉ = −182.001 | | | |

Back focal length 74.9
Total length of the lens 107.4

-continued $f_1 = 105.1$
$f_2 = 115.2$
$f_3 = -37.8$
$f_{1,2} = 56.0$
$f_{4,5} = 63.1$
Petzval sum 0.00259 where $n_1, n_2, \ldots$ represent the refractive indices of the successive lenses for d-line ($\lambda = 587.6$ nm).

* * * * *

UNITED STATES PATENT AND TRADEMARK OFFICE
CERTIFICATE OF CORRECTION

PATENT NO. :   4,457,596
DATED      :   July 3, 1984
INVENTOR(S) :  KOICHI WAKAMIYA It is certified that error appears in the above-identified patent and that said Letters Patent is hereby corrected as shown below:

In the Headnote:

Between item [22] and item [51] insert the following:
--[30]           Foreign Application Priority Data
   October 7, 1981 [JP[  Japan..............56-159773--

Signed and Sealed this

Sixth Day of November 1984

[SEAL]

Attest:

GERALD J. MOSSINGHOFF

Attesting Officer    Commissioner of Patents and Trademarks